United States Patent Office 3,475,501
Patented Oct. 28, 1969

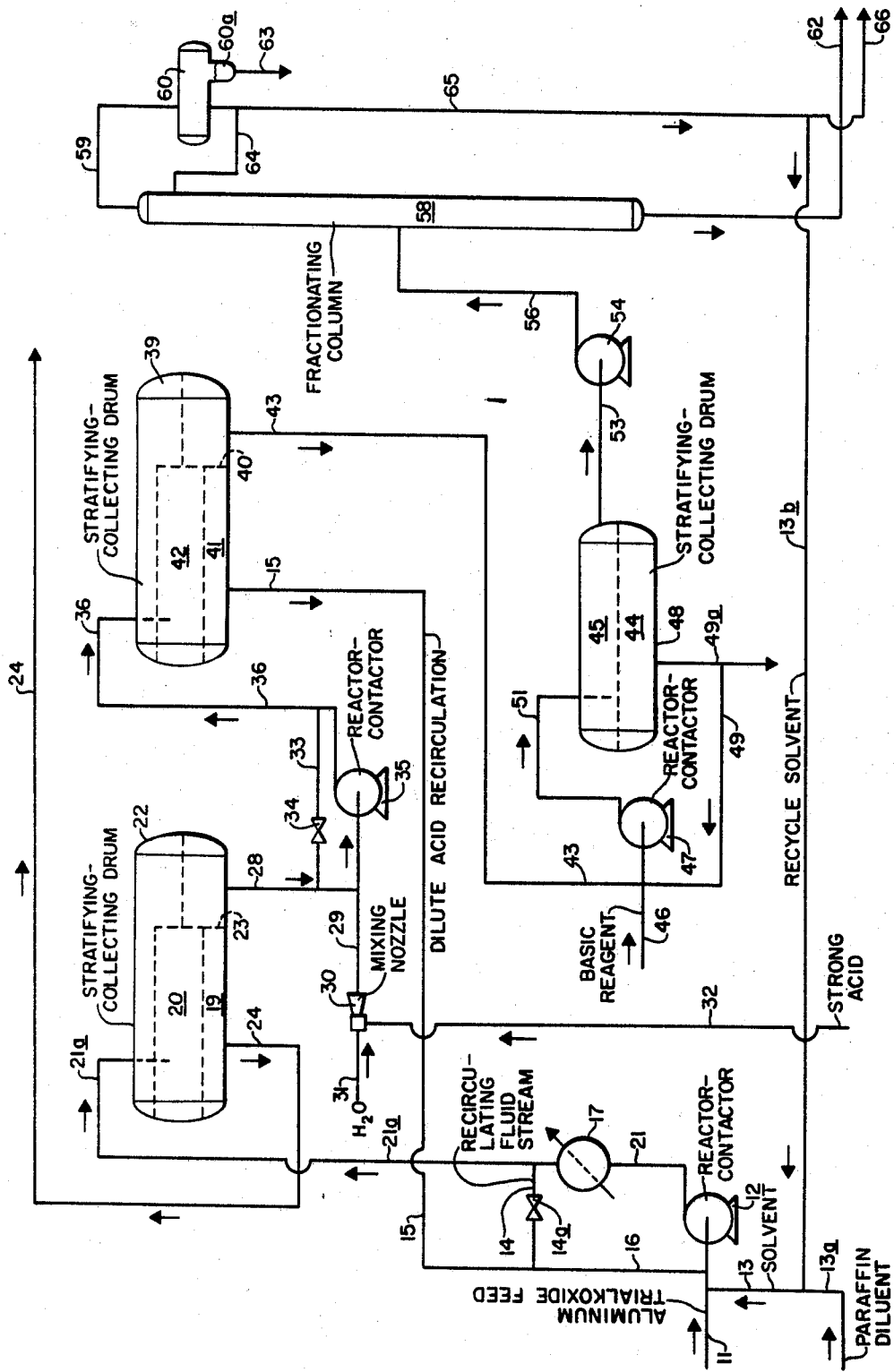

3,475,501
ALCOHOL PRODUCTION
Norman D. Guzick and John H. McCarthy, Baton Rouge, La., assignors to Ethyl Corporation, New York, N.Y., a corporation of Virginia
Continuation-in-part of application Ser. No. 386,498, July 31, 1964. This application Nov. 21, 1967, Ser. No. 684,807
Int. Cl. C07c 29/12, 29/00
U.S. Cl. 260—632　　　　　　　　　　　　　　6 Claims

ABSTRACT OF THE DISCLOSURE

Hydrolysis of aluminum trialkoxide materials to produce alcohols is accomplished while avoiding characteristic gelling problems by adding the alkoxide material to a recirculating fluid stream containing the hydrolyzing reactant immediately prior to a vigorous mixing stage. The vigorous mixing disperses the reactants in the recirculating fluid stream to prevent the setting up of gels which are troublesome in hydrolysis operations. Stratification operations for separation of products are conducted with reactant proportions which avoid significant coincidental reaction which would tend to form gels.

CROSS REFERENCES TO RELATED APPLICATIONS

The invention is a continuation-in-part of co-pending application S.N. 386,498, filed July 31, 1964, now abandoned.

BACKGROUND OF THE INVENTION

Field of the invention

This invention relates to the manufacture of long chain alcohols and other alcohols by the hydrolysis of aluminum trialkoxide materials with the formation of an inorganic aluminum by-product compound. In preferred embodiments, the hydrolysis is with dilute aqueous sulphuric acid in which instance the inorganic aluminum by-product is aluminum sulfate. Preferred sources of aluminum trialkoxide materials involve the formation thereof from aluminum alkyls which are preferably peaked as to molecular weight through plural displacement operations coordinated with Ziegler type chain growth operations as with ethylene upon a lower trialkyl aluminum compound such as triethyl aluminum.

Utility for the alcohols derived by this process is exemplified in the manufacture of detergent materials such as sodium alkyl sulfates while the inorganic by-product materials are usable in the manufacture of catalysts and of paper and in water purification. Alcohols particularly preferred as products of the present process are mixtures and individuals which are predominantly of normal structure ranging from about 12 to 16 carbon atoms per molecule. The process is applicable to the production of alcohols having greater numbers of carbon atoms per molecule such as those of 18, 20 and up to about 30 carbon atoms per molecule and alcohols with fewer carbon atoms per molecule such as those with 6, 8, 10 and fewer carbon atoms per molecule.

Description of the prior art

The hydrolysis reaction of aluminum trialkoxide materials to produce alcohols is described generally in U.S. Patent 2,892,858. The teachings of that patent deal primarily with the general aspects of the hydrolysis reactions using water, acids and bases but do not dwell upon the practical aspects involved in the reactions and for the most part do not even raise the present gel problem aspects connected with the reaction much less attempt to teach details whereby such problems are solved or avoided.

In general, if one merely mixes aluminum trialkoxide with a stoichiometric quantity of hydrolyzing agent such as sulphuric acid, even using dilute aqueous acid solution such as 30 percent acid by weight, a heavy gel is formed almost immediately. This occurs even with incompleteness of reaction, producing a mass of such rigidity as to defy transportation as a fluid to subsequent mixers.

British Patent 941,567 discloses a countercurrent hydrolysis tower having a plurality of stacked stages through which alkoxide flows upward through the stages to produce alcohols while hydrolyzing reactant flows downward through the stages. Complex provision for internal agitation and partitioning is required and the need for small concentration gradients in individual stages imposes a requirement for many stages such as 10 or more. Even where such stages are disposed along a horizontal axis with interstage stratification, such a system is subject to the fundamental disadvantage that the interstage stratification chambers must simultaneously contain significant quantities of both alkoxide reactant and hydrolyzing reactant permitting the reaction to continue in such stratification chambers. These stratification chambers are necessarily inherently devoid of vigorous agitation, otherwise stratification is impossible, so that the formation of gels in the stratification chambers is a serious limitation of such a hydrolysis system.

U.S. Patent 2,232,674 is another example of general art in this area. The general teachings of that patent, although of interest for certain reactions such as the hydration of olefins or the alkylation of hydrocarbons, do not really anticipate much less solve the problems encountered in the hydrolysis of aluminum alkoxide materials. This is dramatically underscored by the basic approach therein of mixing the reactants under hopefully "non-reactive" conditions prior to the delivery of the mixed reactants through small lines to the reaction zone and by the deliberate employment in the reaction zone itself of a so-called "time tank" which, even if it is described as having internal agitation resulting from orifices, inherently provides zones of comparatively low velocity as a result of which regions are provided for the setting-up of gels. One does not find practical "non-reactive" conditions for the present materials.

SUMMARY

In accordance with the fundamental teachings of the present invention, a hydrolysis system is provided based upon the use of a recirculating fluid stream which consists essentially of products of the hydrolysis reaction of aluminum trialkoxide with dilute aqueous mineral acid. Usually the stream contains some small residual quantities of one reactant or the other, but normally not significant quantities, percentagewise, of both. In appropriate instances with exact adjustment of the proportions of the reactants fed and with substantial completion of the reaction in the system, the recirculating stream per se is substantially free of unreacted organic aluminum compounds and a single stage is adequate.

The recirculating fluid stream is subjected to vigorous mixing at at least one point thereof which point is preferably immediately subsequent to the point of admission of reactant aluminum trialkoxide to the system. An important result of this is that the aluminum trialkoxide feed is substantially immediately thoroughly intermingled with and dispersed into the recirculating fluid stream at the point of first contact with hydrolyzing reactant. Another result is the avoidance of localized regions of high concentration of alkoxide material which are the source of much of the problems with gels in connection with the hydrolysis of aluminum trialkoxide materials.

Preferably the mineral acid reactant is added to the recirculating fluid stream just prior to the point of addition to that stream of the aluminum trialkoxide feed.

The fundamental consideration to be emphasized in the systems briefly outlined in the foregoing is that the aluminum trialkoxide feed is dispersed and agitated vigorously almost from the instant at which it is contacted with the acidic reactant and for virtually the entire time that it is in contact with unreacted hydrolyzing reactant thereby preventing the development of continuity in any gel system. This prevention of gel continuity development is enhanced in situations wherein the ratio of the trialkoxide reactant feed to the balance of the recirculation fluid stream is low and of the order of from 1 to 2 to 1 to 10, preferably about 1 to 5, on a weight basis. Under such ratio conditions not only is the dispersion of aluminum trialkoxide reactant thorough but also the larger quantity of the resultant stream permits excellent temperature control and avoidance of degradation of product alcohol by elimination of regions of extremely high reaction rates due to localized overheating. As a general proposition, ratios of alkoxide feed to the balance of the recirculation fluid stream in excess of about 1 to 10 on a weight basis are unnecessary and hence undesirable because of the restriction upon overall throughput capacity imposed thereby in any system of a given size.

In preferred forms of the present invention, the vigorous mixing is provided by a pump and the recirculation fluid stream is in a short passage or loop of pipe tying the pump output back to the input thereof with the point of admission of the aluminum trialkoxide reactant to the system being directly at the input to the pump, virtually impinging upon the moving structure of the pump. In greater detail, the type of pump preferred for its proven excellence of mixing for the present purposes is a centrifugal pump with conventional commercial designs of open impeller centrifugal pumps being entirely satisfactory. The centrifugal type of pump provides, in effect, a highly efficient reactor-contactor, in addition to providing a fluid flow pressure head for circulation of the recirculating fluid stream in the passage or loop and for transport of effluent material from the system to subsequent stages or steps of processing.

The effluent from the pump includes a partially reacted fluid system, viz., alcohols and aluminum sulfate solution, and generally only trace quantities of one or both sulphuric acid and aluminum alkoxide not yet reacted. The major portion of this effluent is by-passed to the input of the pump as described above to constitute the bulk of the recirculating fluid stream. Usually a heat transfer device is provided in this line to assure that the temperature of the reacting mixture does not exceed a particular level of about 100° C., and preferably 95° C. For the most part the hydrolysis reaction is desirably completed to the extent provided by the proportions of the reactants within the pump itself leaving little or no additional reaction possibility beyond such region of vigorous agitation which could form gels that could not be broken up immediately. Thus the length of the loop and volume of the recirculating fluid stream are generally determined from physical considerations for convenience of assembly and maintenance rather than from a reaction "contact time" or "drift space" viewpoint.

A portion of the pump effluent is withdrawn from the system and stratified to produce an upper phase consisting mainly of alcohols and a lower aqueous phase consisting mainly of by-product aluminum sulfate solution. The stratifying operations are preferably under quiescent conditions for a period of at least 30 minutes, longer periods of 1 to 4 hours being preferred, whereby a clearly demarked organic layer is formed, surmounting an aqueous layer.

Product alcohols are preferably treated with an aqueous solution of a basic reagent to neutralize residual acidity. Preferred basic reagents are ammonium hydroxide, sodium hydroxide and the like.

With a system such as the foregoing there are no quiescent pockets where significant quantities of *both* reactants are co-present so that there is no opportunity for the setting-up of gels.

Generally the alkoxide content of the material withdrawn from the foregoing single stage hydrolysis system is small in percent but it is significant in terms of its quantity as losses in large scale operations. Thus, it is generally desirable to subject the alcohol strata from the first stratification mentioned above to a clean-up hydrolysis stage. The alkoxide materials delivered to this stage are highly dilute and highly dispersed so that the concept of the recirculating fluid stream is frequently unnecessary as a gel control proposition; however, a pump by-pass and flow control valve is preferably used to maintain circulation independent of throughput rate. The proven unique effectiveness of the centrifugal pump reactor-contactor in this type of service makes such a device highly desirable. Thus the alcohol strata from the first stratification is fed to the input of a second centrifugal pump reactor-contactor together with additional aqueous acid. The acid fed at this point is typically the fresh acid for the entire hydrolysis operation providing a very complete conversion of remaining alkoxide. It is generally fed as a moderately dilute aqueous solution of about 20–30 wt. percent sulfuric acid. Excess acid from the second hydrolysis is separated by a second stratification of duration similar to that of the first stratification and then is returned to the recirculating fluid stream of the first hydrolysis stage.

Alternately the first hydrolysis stage is supplied directly with some fresh acid as well as with the recycle acid from the second stratification in which case it is possible to use a more dilute acid in the second hydrolysis stage than in the first. Generally speaking, this is desirable to lower the acidity of the product alcohols from the hydrolysis operations.

The alcohol strata from the second stratification, virtually devoid of alkoxide and with minor quantity of acidity present, is then neutralized with basic reagent as previously discussed. Again the proven effectiveness of a centrifugal pump reactor-contactor for this service renders such highly desirable at this step in the operation. As with the second hydrolysis reactor system, gels are not a problem at this step and the recirculating fluid stream concept is not required in the neutralization; however, some recirculation in conjunction with a heat exchanger is frequently beneficial for temperature control purposes. In this instance a recirculation at this point is exemplified for purposes of obtaining a more complete neutralization than is possible in a single pass. The effluent from this pump reactor-contactor is stratified under quiescent conditions for at least about 30 minutes and the organic layer transferred as a crude product stream for further treatment.

BRIEF DESCRIPTION OF THE DRAWING

The details of the opeation of the process will be readily understood from the working example hereinafter, and from the accompanying figure which shows a schematic representation of the process layout embodying the present invention.

Referring to the figure, the principal units of the installation include two centrifugal pump reactor-contactors 12 and 35 for the reaction with sulfuric acid and two stratifying-collecting drums 22 and 39. In most instances, a third reactor-contactor 47 is provided for a final neutralizing treatment, together with a third stratifying-collecting drum 48. A fractionating column 58 is provided for use in most instances to separate either diluent or lower alcohols from the alcohol product.

The stratifying-collecting drums 22 and 39 can be compartmented by weirs 23 and 40 for the stratifying and collecting functions described hereinafter.

A feed line 11 is provided for an aluminum trialkoxide feed stream. This line is joined by a solvent line 13 to permit use of such if desired to lower the viscosity of the materials handled. In addition, recirculation line 16 is connected to line 11. The lines 11, 13 and 16 substantially merge or concurrently feed at the "eye" (input) of the centrifugal-pump reactor-contactor 12. This provides for a highly intimate contacting of reactants without significant delay. It was found that a centrifugal pump operating at normal pumping speed provided the highly effective dual function of initiating reaction while vigorously agitating and intermixing the two immiscible phases and also transferring the effluent material through a withdrawal line. The discharge line 21 from the first reactor-contactor 12 is provided with a branch line 14, having a flow or back pressure control valve 14a whereby a portion of the pump discharge is recirculated through line 16 to the intake of the pump. A line 15 joins the by-pass line 14 to deliver aqueous acid reactant to the recirculating fluid stream. A heat exchanger 17 is disposed in line 21 to cool the system.

The net effluent is withdrawn from the recirculating fluid stream through line 21a and discharged to the feed compartment of the first stratifying-collecting drum 22. Separate discharge lines 24 and 28 are provided from drum 22 for the aqueous and organic or alcohol enriched phases, respectively.

The discharge line 28 is joined by line 29, which is provided for introducing dilute sulfuric acid. The dilute acid is formed in a mixing nozzle 30, which is fed by water through a line 31 and also by a "strong acid" feed line 32. The net feeds to the second reactor-contactor 35 are joined as closely as possible to the intake suction opening of the reactor-contactor 35 to minimize gel problems even there and the discharge stream is passed through line 36 to the feed compartment of the second stratifying-collecting drum 39. A branch line 33 and flow control valve 34 are provided as a by-pass around reactor-contactor 35 similar to that provided for reactor-contactor 12.

An "aqueous" bottoms line 15, from the stratifying-collecting drum 39 is connected to the lines 14 (16) as already described to supply aqueous acid to the recirculating fluid stream.

The "alcohol" bottoms line 43 removes the alcohol or organic phase from the collection end of the stratifying-collecting drum 39 and feeds a third reactor-contactor 47, which is also fed with basic reagent by line 46 and with a recirculating stream by line 49. Again the several lines feeding the reactor-contactor 47 are joined at the intake of 47 or connected together very closely thereto. This, like similar provision at reactor-contactor 35, is a refinement not essential for the handling of gels in continuous smooth operation but one which provides valuable insurance against difficulty due to process upsets and allows control of contacting without undesired limitation by flow rate. The discharge line 51 from the third reactor-contactor 47 is connected to the stratifying-collecting drum 48. A bottoms line 49a therefrom provides for continuous circulation of aqueous basic reactant such as caustic or aqueous ammonia.

The treated alcohol layer from the stratifying-collecting drum 48 is discharged through line 53, and transferred by a pump 54 and line 56 to a fractionating column 58. In some instances the treatment of alcohol from line 43 is accomplished in more than a single stage with a water wash being desirable to remove additional impurities and residual basic reagent.

The fractionating column 58 is provided to distill overhead a fraction or a vapor stream which includes not only a light solvent component, such as paraffin diluent or light alcohols when present, as desired, but also dissolved water which is present in minor quantities in the organic phase, despite the general immiscibility.

An overhead condensate collection or reflux drum 60 is provided with a sump section 60a, whereby water stratified as a lower collected layer from an overhead condensate can be accumulated. A water discharge line 63 from said sump 60a provides for discharge from the system.

A reflux line 64 is provided to permit reflux of a limited quantity of organic phase material.

A liquid overhead product line 65 is branched to a solvent component recycle line 13b and a discharge line 66.

A bottoms line 62 from the fractionating column 58 provides for delivery of the higher alcohol components made by the process to subsequent operations, such as additional fractionation and additional purifiaction where desired for producing particular molecular weight cuts or individual components when the alcohol stream is a mixture of varying components of different molecular weights.

The process is fully applicable to the conversion of relatively pure aluminum trialkoxide components, that is, components which are pure in that only specific alkoxide groups are involved. Thus, if an available stream is aluminum tridecoxide, it is a highly effective feed to the process and of course a product consisting essentially of normal decanol (n-decanol) is produced.

More frequently, the feed to the process includes a mixture of alkoxide aluminum groups. Particularly, a highly desirable feed is a mixture having alkoxide groups of from as low as six to up to about twenty or more carbon atoms, the individual components being separated by two carbon atoms and being present in variable molecular weight concentrations, dependent upon the preceding synthesis history of the aluminum trialkoxide.

When the feed to the process includes a substantial quantity of aluminum tritetradecoxide and higher molecular weight material, it is found that an inert solvent material may be helpful to assure that the alkoxide containing reacting streams and the alcohol containing product process streams retain sufficient fluidity for easy handling. For the most part this is not necessary when using alkoxides with a chain growth history, even with peaking in the 12–16 carbon atoms range, because sufficient residual alkoxy groups in the region of 2–6 carbon atoms each are generally present to provide the desired fluidity.

A particularly and highly effective solvent usable for such systems when desired is normal alcohol of from four to ten carbon atoms per molecule, the four to eight carbon atom alcohols being particularly preferred. When using such product related diluents, or when using extraneous diluents, such as paraffin hydrocarbons or the like, the diluent is provided in such proportions that the crude alcohol product fed, to the fractionating column 58, contains at least about 15 weight percent of such diluent components.

Returning to the recirculating fluid stream associated with the first reactor-contactor 12, the proportion of feed of the acid reactant to the system is preferably controlled carefully so that approximately stoichiometric quantities of acid are supplied, despite fluctuations in alkoxide feed rate. This results in the aqueous phase withdrawn from the first stratifying-collecting drum 22 having little if any residual acidity. Lastly, the entire system of reacting materials should be maintained at temperaure of at least about 80° C., and preferably 85 to 100° C.

Materials of construction is somewhat of a problem because of the corrosive nature of the acid systems involved. Because of the simplicity and horizontal orientation of stratifying and collecting drums, particularly 22 and 39 these are typically lead-lined vessels. The piping is preferably plastic-lined steel pipe with Teflon-lined pipe preferred despite the cost.

DESCRIPTION OF THE PREFERRED EMBODIMENT

To illustrate the process more specifically, the following working example illustrates the processing of a specific feed stream concentrated in alkoxide groups of 14, 16, and 18 carbon atoms, in a process installation as illustrated by the figure.

EXAMPLE

A feed aluminum trialkoxide mixture is introduced through line 11, and has the composition tabulated below, expressed in terms of weight percent of aluminum alkoxide moieties, AlOR, wherein R is an alkyl group and Al is one-third atomic equivalent of aluminum

| Alkoxide groups: | Weight percent |
|---|---|
| Ethoxide and butoxide | <2 |
| Hexoxide, about | 2 |
| Octoxide | 7 |
| Decoxide | 6.4 |
| Dodecoxide | 38 |
| Tetradecoxide | 25 |
| Hexadecoxide | 13 |
| Octadecoxide and higher, about | 6.5 |

In addition to the aluminum alkoxide components identified, the feed frequently includes a heavier residual component from prior processing which is largely heavy olefin hydrocarbons corresponding in carbon atoms per molecule to the number of carbon atoms in the organo residues on the aluminum, and further includes some aluminum complex component. This last material is relatively inactive and is present to the extent of about 9 weight percent of the aluminum alkoxide components listed.

The aluminum alkoxide feed through line 11 is joined by a recycle solvent stream consisting essentially of normal butanol and hexanol, in proportions of about 28 pounds per hundred weight of the aluminum alkoxide in the feed through line 11. Further, provided through line 16 is the recirculating fluid stream, which includes an aqueous acid reactant phase provided through line 15. Said recirculating fluid stream including the aqueous acid reactant phase is in proportions of about 500 pounds per hundredweight of feed of aluminum trialkoxide.

The reactor-contactor 12 is a conventially designed centrifugal pump operating at a speed of about 1750 r.p.m. The operation of the pump thoroughly mixes and agitates the said components before delivering through the discharge line 21. A heat exchanger 17 in the discharge line provides sufficient cooling of this stream so that the temperature does not rise above about 95° C. Approximately 80 percent of the total pump effluent is by-passed through line 14 to recirculate, the exact ratio being readily controllable by adjustment of valve 14a.

The remainder of the effluent is withdrawn through line 21a and delivered to the feed or receiving section of the stratifying-collecting drum 22. An average residence time of one to four hours is provided in drum 22 on a basis of volume and throughput rate in order to assure a complete and full stratification on the organic layer from the aqueous layer. There is no need to make special provision for agitation in drum 22.

The aqueous layer 19 accumulated in the receiving compartment of the stratifying-collecting drum 22 is an aqueous solution of aluminum sulfate, $Al_2(SO_4)_3$, at a concentration of about 27 weight percent. The organic or alcohol rich layer 20 corresponds essentially to alcohol derived from the feed composition already identified, plus non-reacted hydrocarbon diluents present therein, and is water saturated. The overflow alcohol layer is discharged through line 28, which is joined by sulfuric acid fed through line 29, at a concentration of about 23 to 24 weight percent.

The second reactor-contactor 35 is similar in construction and operation to the first reactor-contactor 12, and delivers the thoroughly mixed effluent through line 36 to a collection space or receiving space of the stratifying-collecting drum 39. The aqueous layer 41 accumulated therein may be almost at full feed acid strength, viz., about 22 to 23 weight percent sulfuric acid content, and contains some aluminum sulfate resulting from the reaction of residual alkoxide in the reactor-contactor 35 and successive line 36. As previously noted, other embodiments provide for more direct delivery of additional acid to the recirculating fluid stream of reactor-contactor 12 to show the use of a dilute acid in the system of reactor-contactor 35. A principal advantage of such an alternate arrangement is a general reduction in the amount of residual acid in the alcohols from drum 39. A residence time of from one to four hours is provided for the material delivered to stratifying-collecting drum 39. The organic phase accumulates as a surmounting layer 42 and is collected and discharged through line 43.

This material containing residual acid is joined by aqueous caustic fed through line 46. The caustic is typically at a concentration of less than ten weight percent and is provided at a net rate of about one-tenth to one-half weight percent sodium hydroxide based on the alcohol phase. The third reactor-contactor 47 again accomplishes the function of highly efficient blending and mixing of the dissimilar phases whereby residual acidity in the organic layer is fully neutralized so that after delivery through line 51 to the stratifying-collecting drum 48, the overhead alcohol layer accumulated therein is virtually acid free. The alcohol layer, after a minimum stratifying residence time of about 30 minutes, is transferred through line 53 and delivery pump 54, to the feed line 56 for the fractionating column 58. The fractionating column vaporizes substantially all dissolved water and the butanol and hexanol components in the crude alcohol feed. These alcohols, as previously mentioned, include a substantial quantity functioning as a diluent, and generally about 80 percent thereof is recirculated through line 13b.

In an operation as above described, virtually complete gel-free utilization of the aluminum alkoxide in the desired product ranges is achieved, and a high recovery of the aluminum and acid components as aluminum sulfate, is obtained in line 24.

When the feed system is, for example, aluminum trialkoxide with all alkoxide groups thereof containing from six to not more than about twelve carbon atoms, the diluent provided through line 13 is of little additional value and can be eliminated. On the other hand when the feed is concentrated in higher alkoxide groups particularly of fourteen and higher carbon atoms, the diluent components provided are quite essential.

Instead of the process engendered butanol and hexanol employed in the above working example, a paraffin diluent, consisting of paraffin hydrocarbons having about eight to ten carbon atoms per molecule is provided through line 13a. Substantially equivalent results insofar as the efficacy of the reaction and handling is concerned are achieved. Alternatively, if a supply of butanol, or amyl alcohol, is readily available, it can be substituted for the process generated normal butanol and n-hexanol containing stream.

What is claimed is:

1. A process for reacting aluminum trialkoxide and mineral acid to produce alcohols through hydrolysis comprising, adding a first one of the reactants to a recirculating fluid stream as hereinafter defined at a first point of admission, adding a second one of the reactants to the combination of the stream plus the first one of the reactants at a second point of admission downstream from the first point of admission, the weight ratio of the second reactant relative to the balance of said stream being from about 1:2 to about 1:10, vigorously mixing said stream and reactants immediately subsequent to the second point of admission whereby reaction of the reactants is substantially complete to the extent provided by the proportions of the second one of the reactants in the region of vigorous mixing, and withdrawing a portion of said stream containing co-present reaction products and excess reactants after the region of vigorous mixing to remove a portion of the reaction products, including product alcohols, said recirculating stream being that portion of said stream containing co-present reaction products and excess reactants which is not withdrawn, the relative proportions of the reactants fed being approximately stoichiometric, reaction temperature being from about 80° to about 100° C.

2. The process of claim 1 wherein the weight ratio of the aluminum alkoxide reactant feed to the balance of the recirculating fluid stream at the point of vigorous mixing is about 1:5.

3. The process of claim 1 wherein the vigorous mixing is performed in a pump which provides energy for the recirculation of the recirculating fluid stream.

4. The process of claim 3 wherein the pump is a centrifugal pump.

5. A process in accordance with claim 1 performed in at least two similar stages characterized in that the hydrolysis reaction is incomplete in the first stage and in that a portion withdrawn from the first stage is subjected to reaction in a second similar stage with an excess of fresh acid, and in that the excess acid remaining from said second stage is recovered and fed to the first stage as at least a portion of the mineral acid reactant used in said first stage.

6. The process of claim 5 further characterized in that the portion withdrawn from the first stage and subjected to reaction in the second stage is essentially the net alcohol throughput of the system.

References Cited

UNITED STATES PATENTS

| 2,232,674 | 2/1941 | Pyzel. |
| 2,636,865 | 4/1953 | Kimberlin. |
| 2,790,836 | 4/1957 | Mitchell et al. _____ 260—635 |
| 3,089,884 | 5/1963 | Marshall. |
| 3,100,231 | 8/1963 | Roha et al. |
| 3,247,264 | 4/1966 | Beears et al. |
| 3,255,256 | 6/1966 | Miller. |

FOREIGN PATENTS

| 844,638 | 8/1960 | Great Britain. |
| 935,802 | 9/1963 | Great Britain. |
| 941,567 | 11/1963 | Great Britain. |
| 1,304,370 | 8/1962 | France. |
| 112,169 | 10/1962 | Pakistan. |

LEON ZITVER, Primary Examiner

J. E. EVANS, Assistant Examiner

U.S. Cl. X.R.

23—52; 260—643